US008783075B2

(12) United States Patent
Matre

(10) Patent No.: US 8,783,075 B2

(45) Date of Patent: Jul. 22, 2014

(54) LATCH ASSEMBLY

(75) Inventor: Daniel A. Matre, Brookfield, WI (US)

(73) Assignee: Matre Group, LLC., Brookfield, WI (US)

( * ) Notice: Subject to any disclaimer, the term of this patent is extended or adjusted under 35 U.S.C. 154(b) by 191 days.

(21) Appl. No.: 13/443,334

(22) Filed: Apr. 10, 2012

(65) Prior Publication Data

US 2012/0260700 A1 Oct. 18, 2012

Related U.S. Application Data

(60) Provisional application No. 61/474,587, filed on Apr. 12, 2011.

(51) Int. Cl.
*B60R 25/02* (2013.01)

(52) U.S. Cl.
USPC 70/208; 292/216; 292/DIG. 23; 292/DIG. 31

(58) Field of Classification Search
USPC ............... 70/208; 292/216, DIG. 23, DIG. 31
See application file for complete search history.

(56) References Cited

U.S. PATENT DOCUMENTS

| | | | | |
|---|---|---|---|---|
| 4,082,353 | A | 4/1978 | Hollowell | |
| 4,703,961 | A | 11/1987 | Weinerman et al. | |
| 5,299,844 | A | 4/1994 | Gleason | |
| 5,564,295 | A | 10/1996 | Weinerman et al. | |
| 5,586,458 | A | 12/1996 | Weinerman et al. | |
| 5,884,948 | A | 3/1999 | Weinerman et al. | |
| 6,419,286 | B1 | 7/2002 | Szablewski | |
| 6,471,260 | B1 | 10/2002 | Weinerman et al. | |
| 6,513,353 | B1 | 2/2003 | Weinerman et al. | |
| 6,651,467 | B1 | 11/2003 | Weinerman et al. | |
| 6,695,362 | B2 | 2/2004 | Kluting et al. | |
| 6,705,178 | B1 * | 3/2004 | Grandjean | 74/502.4 |
| 6,708,537 | B1 * | 3/2004 | Eschweiler et al. | 70/208 |
| 6,942,259 | B2 * | 9/2005 | Marzolf et al. | 292/216 |
| 7,267,377 | B2 * | 9/2007 | Marzolf et al. | 292/25 |
| 7,267,380 | B2 | 9/2007 | Bullock et al. | |
| 7,513,541 | B1 | 4/2009 | Gregory | |
| 7,726,707 | B2 | 6/2010 | Simchayoff et al. | |
| 2004/0140678 | A1 | 7/2004 | Linares | |
| 2006/0006668 | A1 * | 1/2006 | Hidding et al. | 292/216 |
| 2008/0217929 | A1 * | 9/2008 | Zweibohmer | 292/216 |

OTHER PUBLICATIONS

Documents from Southco, www.southco.com, Jan. 25, 2005.

* cited by examiner

*Primary Examiner* — Suzanne Barrett
(74) *Attorney, Agent, or Firm* — Boyle Fredrickson, S.C.

(57) ABSTRACT

The present disclosure is directed to a latch assembly that includes a pawl assembly, a lever assembly and a lock assembly. The pawl assembly is actuated from an open position to a closed assembly by the lever assembly. The lever assembly includes a drive lever having a slot and a driven lever having a slot that is open on one end. The lock assembly has an engagement member that moves along the slot of the drive lever between an engaged position and a disengaged position. When in the engaged position, the engagement member is received within the slot of the driven lever. When in the disengaged position, the engagement member is outside of the slot of the driven lever.

19 Claims, 15 Drawing Sheets

LATCH ASSEMBLY

CROSS REFERENCE TO RELATED APPLICATIONS

This application claims priority under 35 U.S.C. §119(e) to U.S. Provisional Application Ser. No. 61/474,587 filed Apr. 12, 2012 and entitled "Latch Assembly," the entire contents of which are hereby expressly incorporated by reference into the present application.

BACKGROUND OF THE INVENTION

The present invention relates generally to a latch assembly used to releasably secure a door. Generally speaking, the latch assembly includes various subassemblies including a pawl assembly, a lever assembly, and a lock assembly. These subassemblies cooperate during operation of the lock. For example, when a user closes the door the pawl assembly receives and secures a strike, thus securing the door in place. In order to open the door, the pawl assembly must be actuated so as to release the strike. First, a user unlocks the door by actuating the lock assembly, e.g., with a key. When unlocked, the user then pulls the handle, which in turn actuates the lever assembly. The lever assembly actuates the pawl assembly to release the strike, which enables the user to open the door. When in the locked position, the lock assembly prevents the lever assembly from actuating the pawl the assembly.

SUMMARY OF THE INVENTION

The present invention is directed to a latch assembly that may be integrated into a door, such as a door on a vehicle. In one embodiment, the latch assembly includes a pawl assembly having an open position and a closed position. The pawl assembly is actuated from the open to the closed assembly by a lever assembly that includes a drive lever having a slot and a driven lever having a slot that is open on one end. The latch assembly further includes a lock assembly having an engagement member that moves along the slot of the drive lever between an engaged position and a disengaged position. When in the engaged position, the engagement member is received within the slot of the driven lever. When in the disengaged position, the engagement member is outside of the slot of the driven lever.

In another embodiment, the latch assembly includes a housing and a lever assembly supported by the housing. The lever assembly includes a drive lever having a slot and a driven lever having a slot. The drive lever drives the driven lever when an engagement member is positioned within the slot of the driven lever. The lever assembly further includes a cam lever that actuates the drive lever. The cam lever is positioned on one side of the housing and does not extend through the housing.

In another embodiment, the latch assembly includes a housing and a handle that is rotatably attached to the housing by an axle. There is a pawl assembly supported by the housing. The pawl assembly has an open position and a closed position. A lever assembly actuates the pawl assembly from the closed position to the open position. The lever assembly is supported by the housing and includes a drive lever having a slot, a driven lever having a slot that is open on one end; and a cam lever that actuates the drive lever. The cam lever is secured to a collar that rotates about the axle, and which causes the cam lever to rotate. The cam lever is positioned on one side of the housing and does not extend through the housing. The latch assembly further includes a lock assembly having an engagement member that moves along the slot of the drive lever between an engaged position and a disengaged position. When in the engaged position, the engagement member is received within the slot of the driven lever. When in the disengaged position, the engagement member is outside of the slot of the driven lever. The drive lever drives the driven lever only when the engagement member is in the engaged position.

BRIEF DESCRIPTION OF THE DRAWINGS

The present invention is illustrated in the accompanying drawings in which like reference numerals represent like parts throughout.

In the drawings.

DETAILED DESCRIPTION

A latch assembly 8 is shown in FIGS. 1-12. Generally speaking, the latch assembly 8 includes three subassemblies—a lock assembly 7, a pawl assembly 21, and a lever assembly 100. The lock assembly 7 enables a user to lock and unlock the latch assembly 8. When the latch assembly 8 is in the locked position, the pawl assembly 21 cannot be actuated by the lever assembly 100. Conversely when the latch assembly 8 is in the unlocked position, the pawl assembly 21 can be actuated by the lever assembly 100. The interrelation of these subassemblies is discussed below.

Figure 1:
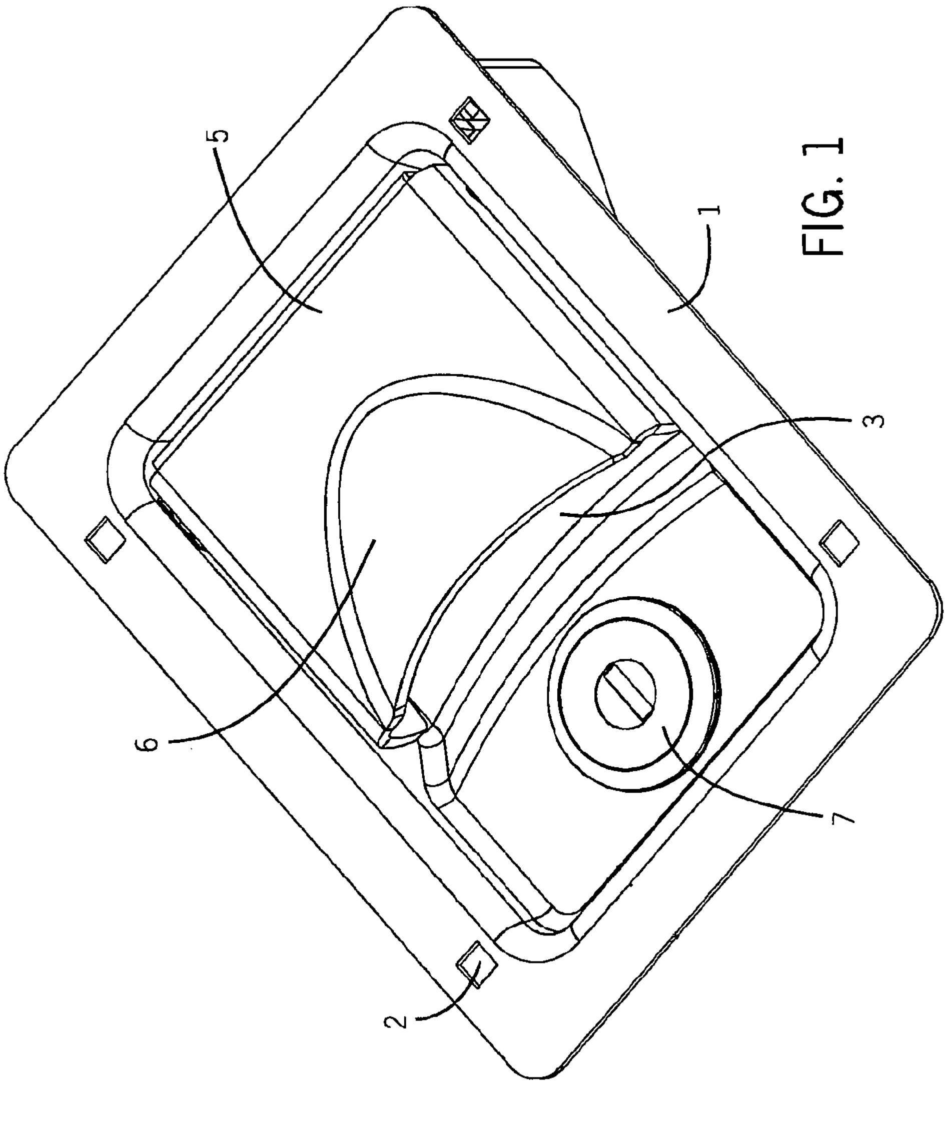
FIG. 1 is an isometric view of one embodiment of the latch assembly of the present invention.

With respect to the latch assembly 8, FIG. 1 shows a front side, e.g., the side that faces the user, of the latch assembly 8. The latch assembly 8 has a generally rectangular footprint, though this could be varied and/or resized as desired. The housing 1 includes a plurality of mounting holes 2 that are used to secure the latch assembly 8 to a desired object. For example, in one embodiment, the latch assembly 8 may be secured to the door of a utility vehicle, where the latch assembly 8 enables a user to open, close and lock the door. Any type of suitable mechanical fastener, e.g., rivets, screws or a nut-bolt combination, may be received by the holes 2 and used to secure the latch assembly 8 to the desired object. Alternatively, the latch assembly 8 could be secured to an object via any other suitable means, such as welding or by using an adhesive of sufficient strength. The housing 1 includes a flat perimeter surface that is placed flush against the object, e.g., door, to which the latch assembly 8 is to be attached.

The latch assembly 8 further includes an actuating lever or handle 5 that enables a user to actuate the latch assembly 8. The handle 5 may include a flange 6 that facilitates actuation of the lever 5. During operation, the user inserts one or more fingers into a gap 3 between the handle 5 and the housing 1. As shown in FIG. 1, the gap 3 is below the flange 6. As shown in FIG. 1, the flange 6 is angled with respect to the main portion of the handle 5. The user then pulls on the handle 5 in order to actuate the latch assembly 8. The latch assembly 8 may further include a keyed lock assembly 7, which allows a user to lock the latch assembly 8 using a key.

Lock Assembly

Figure 2:
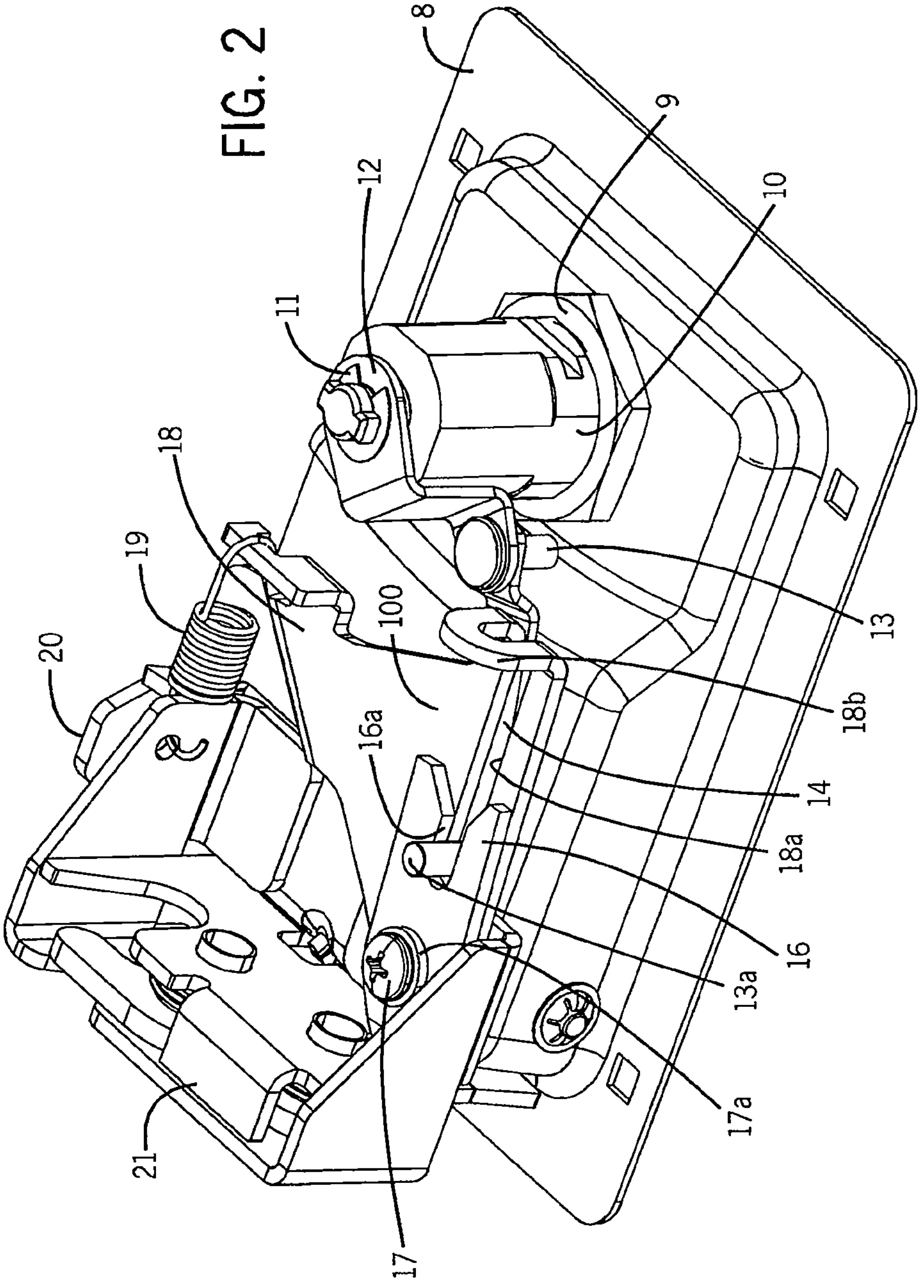
FIG. 2 is an isometric view of the latch assembly of FIG. 1 with the rear cover removed.

As shown in FIG. 2, the lock assembly 7 includes a nut 9, a lock set 10, a gasket **10*a* and a clip 11 that facilitate the locking and unlocking of the latch assembly 8. The clip 11 securing the lever 12 to the protrusions 10*b* and 10*c* could also be accomplished by a threaded fastener. The lock set 10 includes a protrusion 10*b*. A lever 12 engages the protrusion 10*b* so that rotating the protrusion 10*b* also rotates the lever 12. As shown in FIG. 5*a*, the lock assembly may include an adaptor 81 so that a variable size, e.g., smaller, lock set 80 may be used with the lock assembly 7. An adaptor 81 includes a faceted shoulder 81*a* and faceted hole 82 on the housing 1 that, when using a key, prevents rotation of the lock set 80 resulting in rotation of the protrusion 10*c***.

Figure 12:
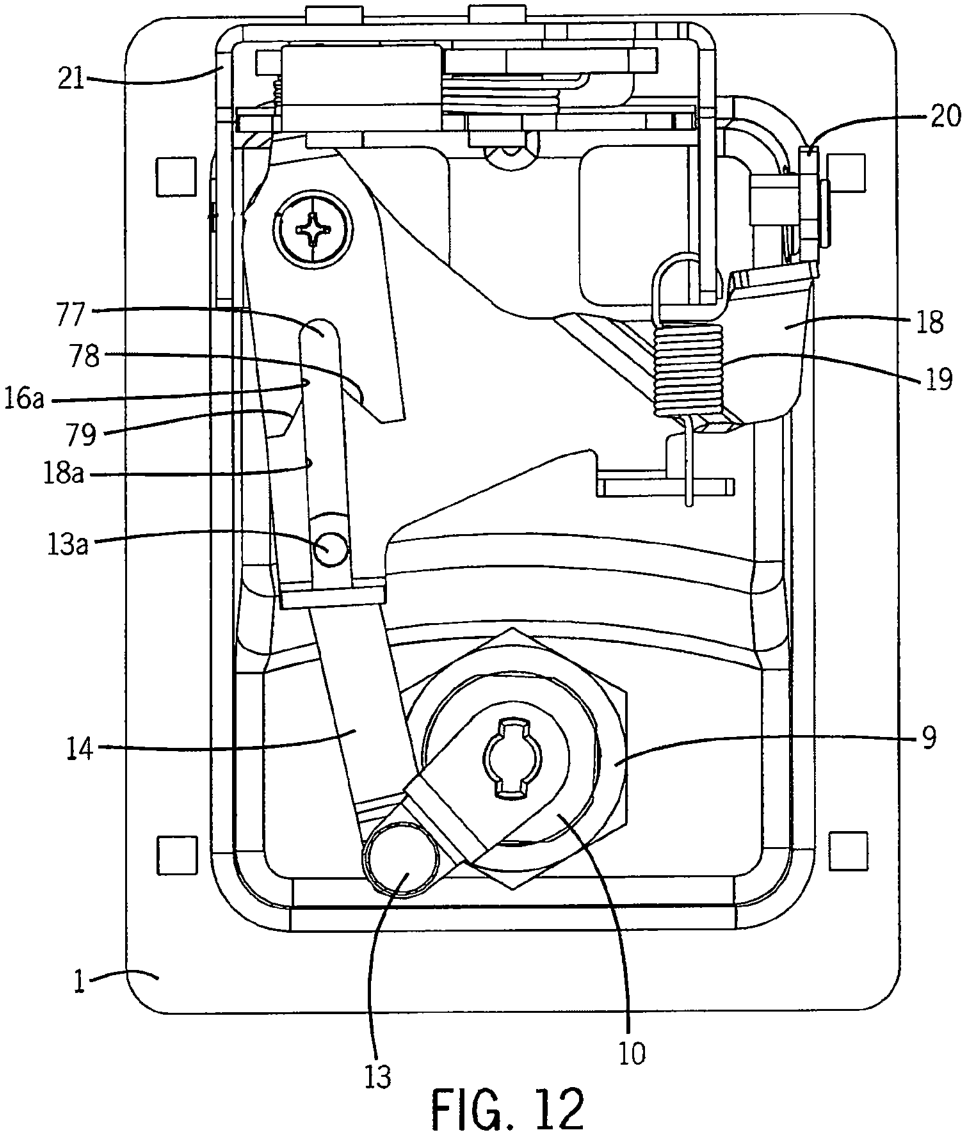
FIG. 12 is another elevational view of the latch assembly of FIG. 1.

As shown in FIG. 12, for example, the lock assembly 7 may be centered along a longitudinal axis of the housing 1. The lever 12 is operably connected, e.g., via pin 13, with rod 14. Rod 14 has an engagement member **13*a*, e.g., a protrusion or a pin, that serves as a mechanical link between the drive lever 18 and driven lever 16 of the lever assembly 100, which enables the lever assembly 100 to actuate the pawl assembly 21 when the latch assembly 8 is unlocked. The faceted hole 82 on housing 1 engages the facets on the lock set 10 that, when using a key, prevents rotation of the lock set 10 resulting in rotation of protrusion 10*b***.

When the protrusion **13*a* is positioned in a first position, e.g., when the protrusion is engaged with the driven lever 16, the protrusion 13*a* enables the driven lever 16 to be actuated by the drive lever 18, which in turn actuates the pawl assembly 21. This enables the user to open the latch assembly 8. The protrusion 13*a* is shown in the first position in FIG. 2**.

When the protrusion **13*a* is positioned in a second position, e.g., when the protrusion 13*a* does not engage with the driven lever 16, the lever assembly 100 cannot actuate the pawl assembly 21. Accordingly, the user cannot open the latch assembly 8, which remains closed. In other words, the user can pull on the handle 5, but the latch assembly 8 will not permit the door to be opened because the driven lever 18 cannot actuate the pawl assembly 21**.

During operation, the lock assembly 7 moves the protrusion **13*a* into either the first position, e.g., the unlocked position, or the second position, e.g., the locked position. As can be understood in FIG. 2, the lever 12 is rotated, e.g., when the user inserts a key into the lock assembly 7 and turns the key. The rotation of lever 12 causes rod 14 to move between the first position and second position depending on the direction in which the lever 12 is rotated. For example, when the lever 12 is rotated in one direction (e.g., clockwise in the context of FIG. 2), the rod 14 and protrusion 13*a* are pushed away from the lever 12 and into the first position, thus causing the protrusion 13*a* to engage the driven lever 16. When the lever 12 is rotated in the opposite direction (e.g., counterclockwise in the context of FIG. 2), the rod 14 and protrusion 13*a* are pulled toward the lever 12 and into the second position, thus disengaging the protrusion 13*a* from the driven lever 16. Protrusion 13*a* is press fitted into hole 54 of rod 14. Pin 13 engages hole 55 of rod 14 simultaneously with hole 52 of lever 12 so as to allow a pivoting action between levers 14 and 12**.

Figure 9:
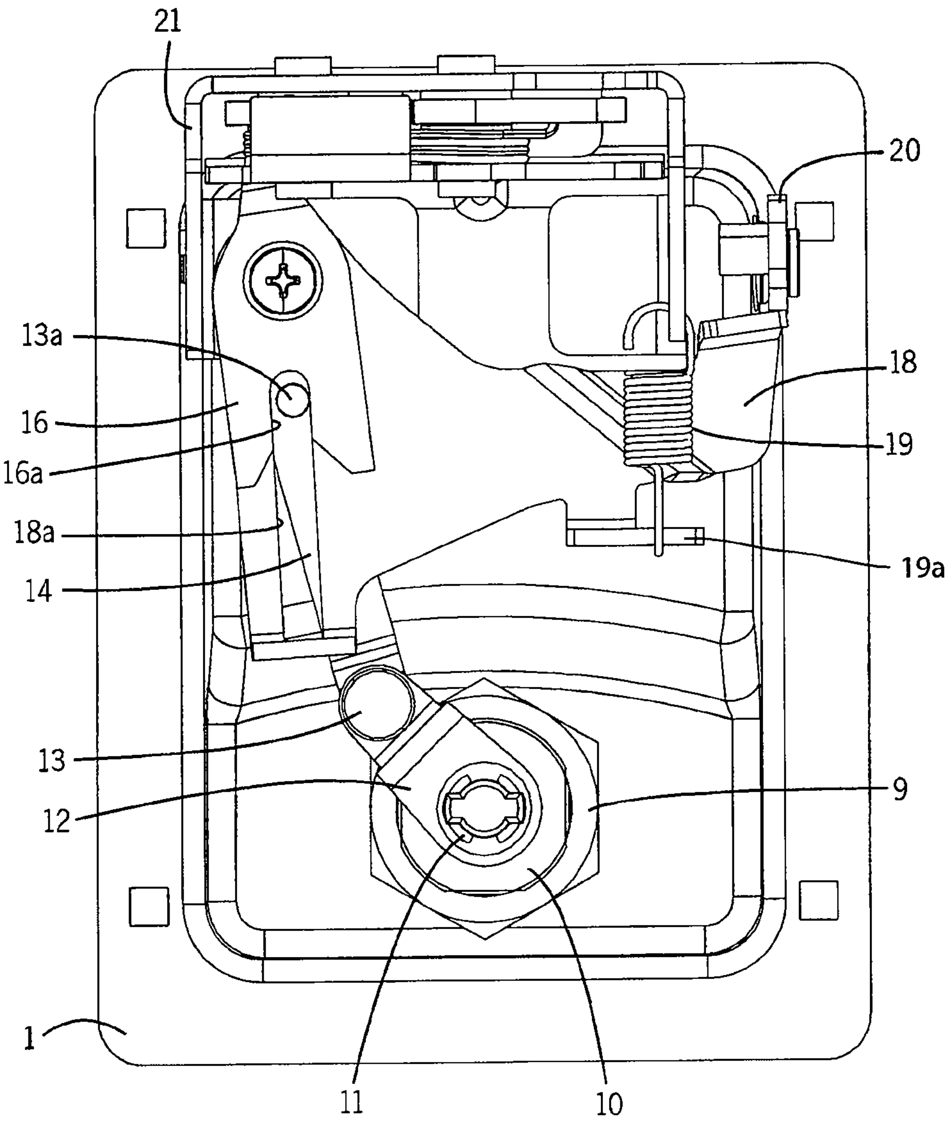
FIG. 9 is an elevational view of the latch assembly of FIG. 1 in an unlocked, unactuated position.

As shown in FIGS. 2, 9 and 12, for example, the protrusion **13*a* is received within and travels along a slot 18*a* of the drive lever 18. The slot 18*a* guides the protrusion 13*a* and mechanically links the drive lever 18 to the rod 14 of the lock assembly 7. The slot 18*a* of the driven lever 18 provides a linear path along which the protrusion 13*a* travels. Thus, the protrusion 13*a*** travels along a linear path between the first position, i.e., the unlocked position, and the second position, i.e., the locked position.

The driven lever 16 has an open slot **16*a* that receives the protrusion 13*a* when the latch assembly 8 is unlocked. It is preferable to have an open slot 16*a* on the driven lever 16 as opposed to a closed slot because an open slot 16*a* allows for the protrusion 13*a* to completely disengage from the driven lever 16 when the latch assembly is locked. In the embodiment shown, when the protrusion 13*a* is in the second position, it is outside of the slot 18*a*. Because the protrusion 13*a*, and therefore the drive lever 18, is completely disengaged from the driven lever 16 in the locked position, unwanted stresses and strains that would otherwise be placed on the driven lever 16 when the latch assembly 8 is actuated, e.g., a user pulls the handle 5, in the locked position, can be reduced or eliminated. As shown in FIG. 12, the open slot 16*a* of the driven lever 16 includes a pair of beveled edges 78, 79 that help to guide the protrusion 13*a* into the slot 16*a* as the protrusion moves along the slot 18*a* of the drive lever 18. In other words, the edges 78, 79 account for any play (or minor movement) the driven lever 16 may experience during normal operation of the latch assembly 8**.

Pawl Assembly

Figure 3:
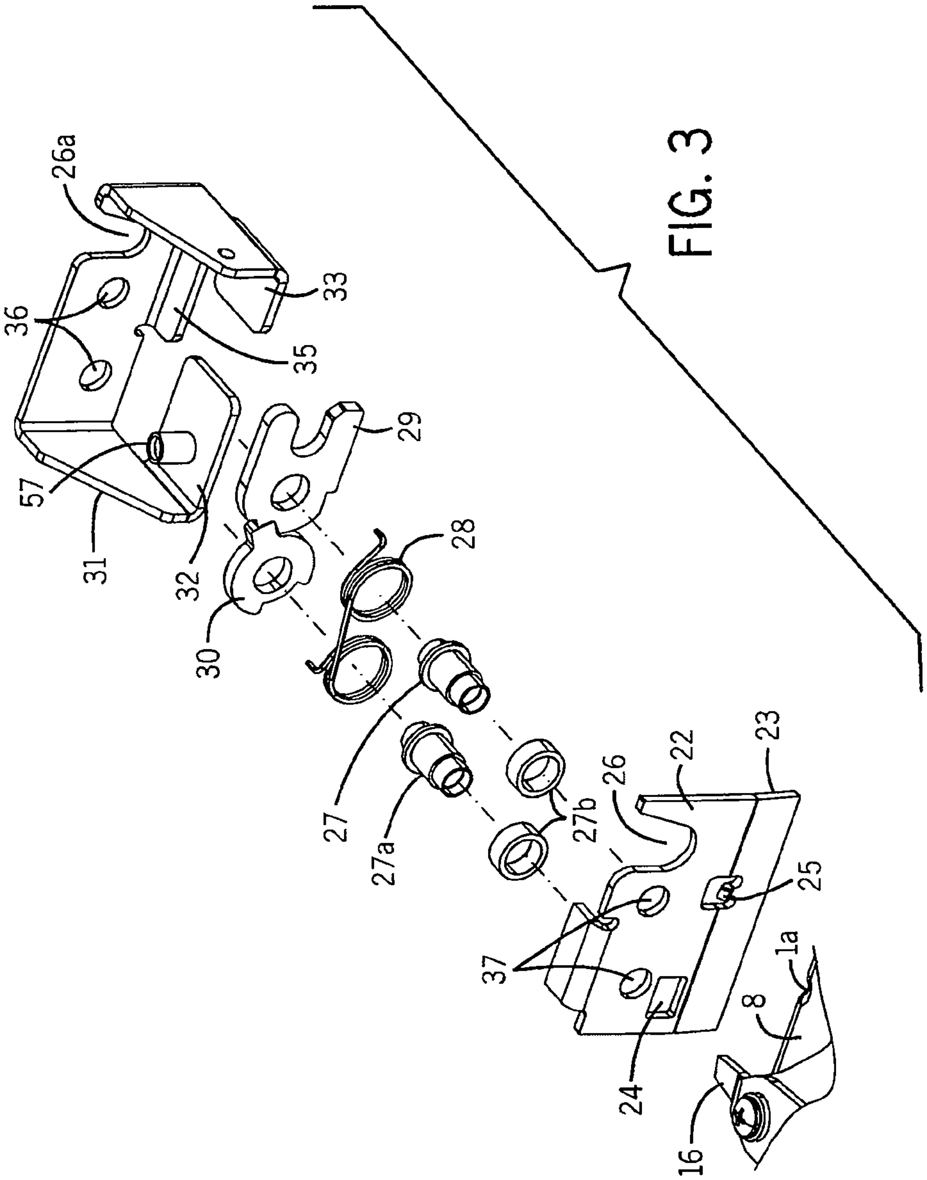
FIG. 3 is an exploded view of a pawl assembly that is incorporated into the latch assembly of FIG. 1.
Figure 4A:
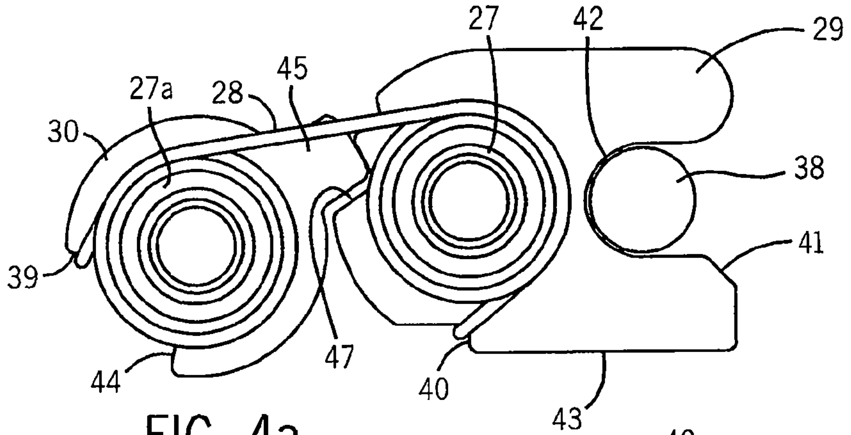
FIG. 4*a* is an elevation view of the pawl assembly of FIG. 3 in a closed position.
Figure 4B:
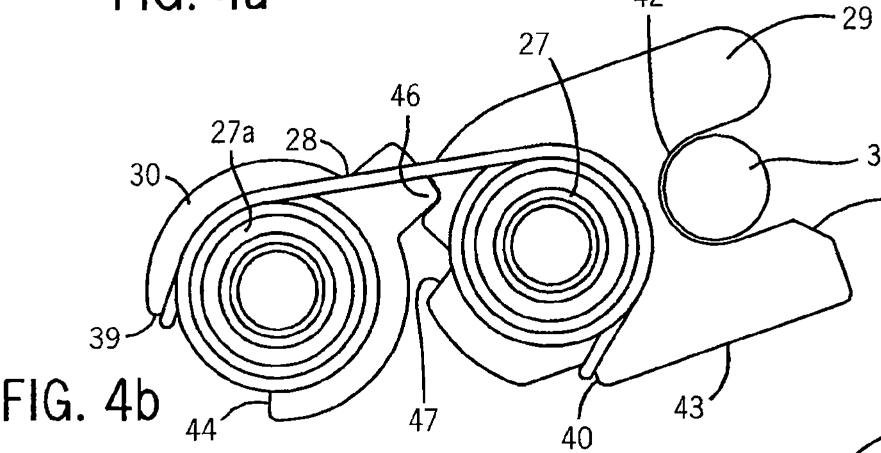
FIG. 4*b* is an elevation view of the pawl assembly of FIG. 3 in an intermediate position.
Figure 4C:
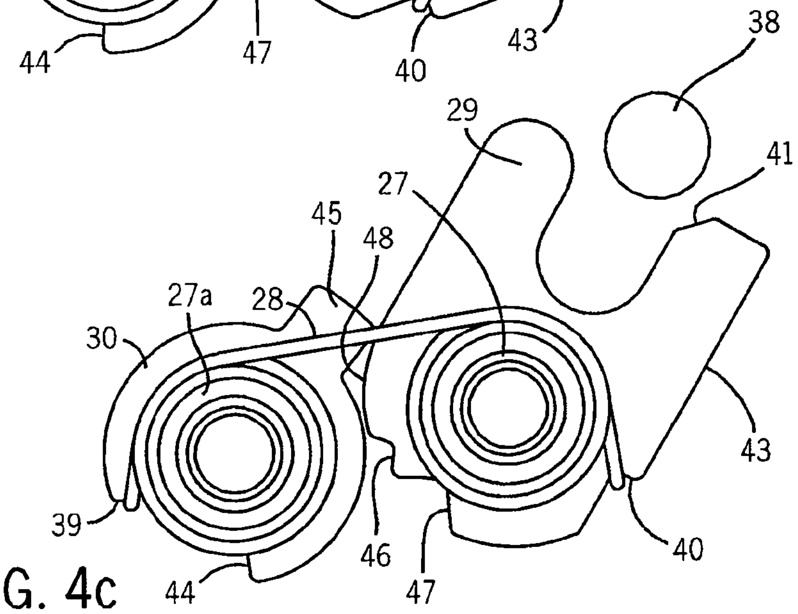
FIG. 4*c* is an elevation view of the pawl assembly of FIG. 3 in an opened position.
Figure 5:
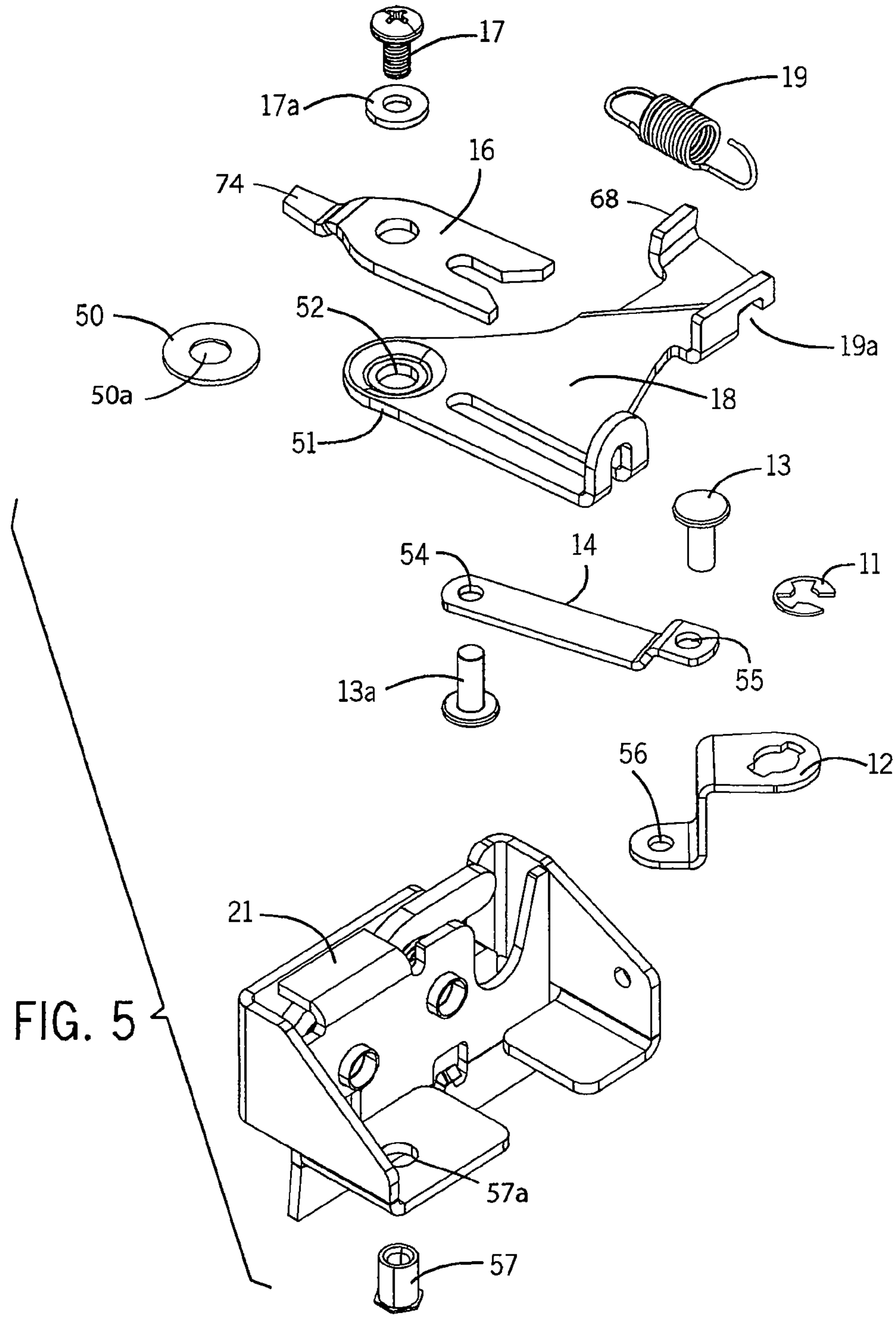
FIG. 5 is an exploded view of a lever assembly that is incorporated into the latch assembly of FIG. 1.
Figure 5A:
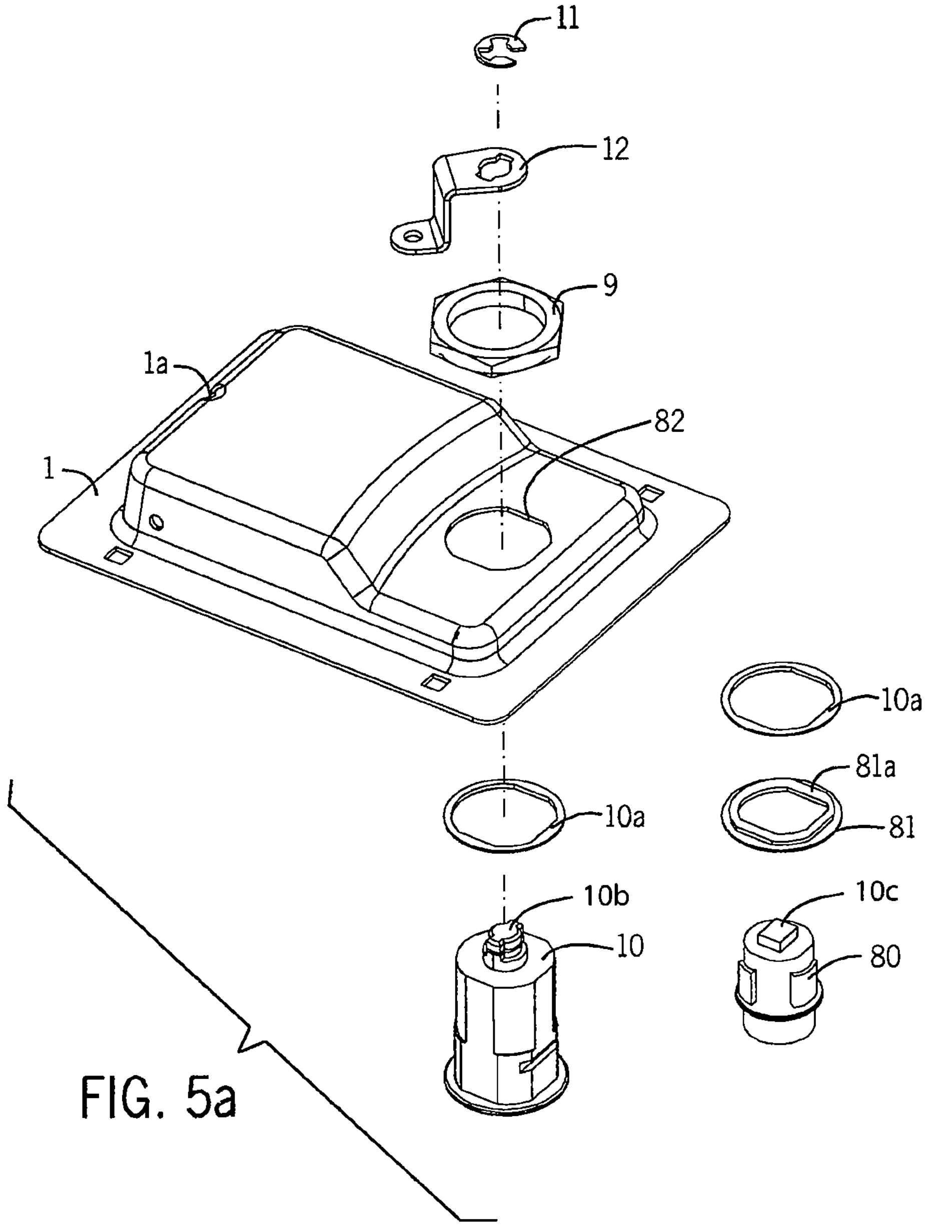
FIG. 5*a* is an exploded view of a lock assembly that is incorporated in to the latch assembly of FIG. 1.

The pawl assembly 21 is shown in greater detail in FIGS. 3-5. As shown in FIG. 3, the pawl assembly includes an inner bracket 22 and an outer bracket 31 that combine to house the various components of the pawl assembly 21, including the latch 29 and pawl 30. The inner bracket 21, which is proximate the housing 1 of the latch assembly 8, includes a slot 24 that receives the driven lever 16. The driven lever 16 extends through the slot 24 and engages the pawl 30. The slot 24 is sized so as to enable sufficient movement of the lever 16 within the slot 24 so as to actuate the pawl assembly 21.

Figure 11:
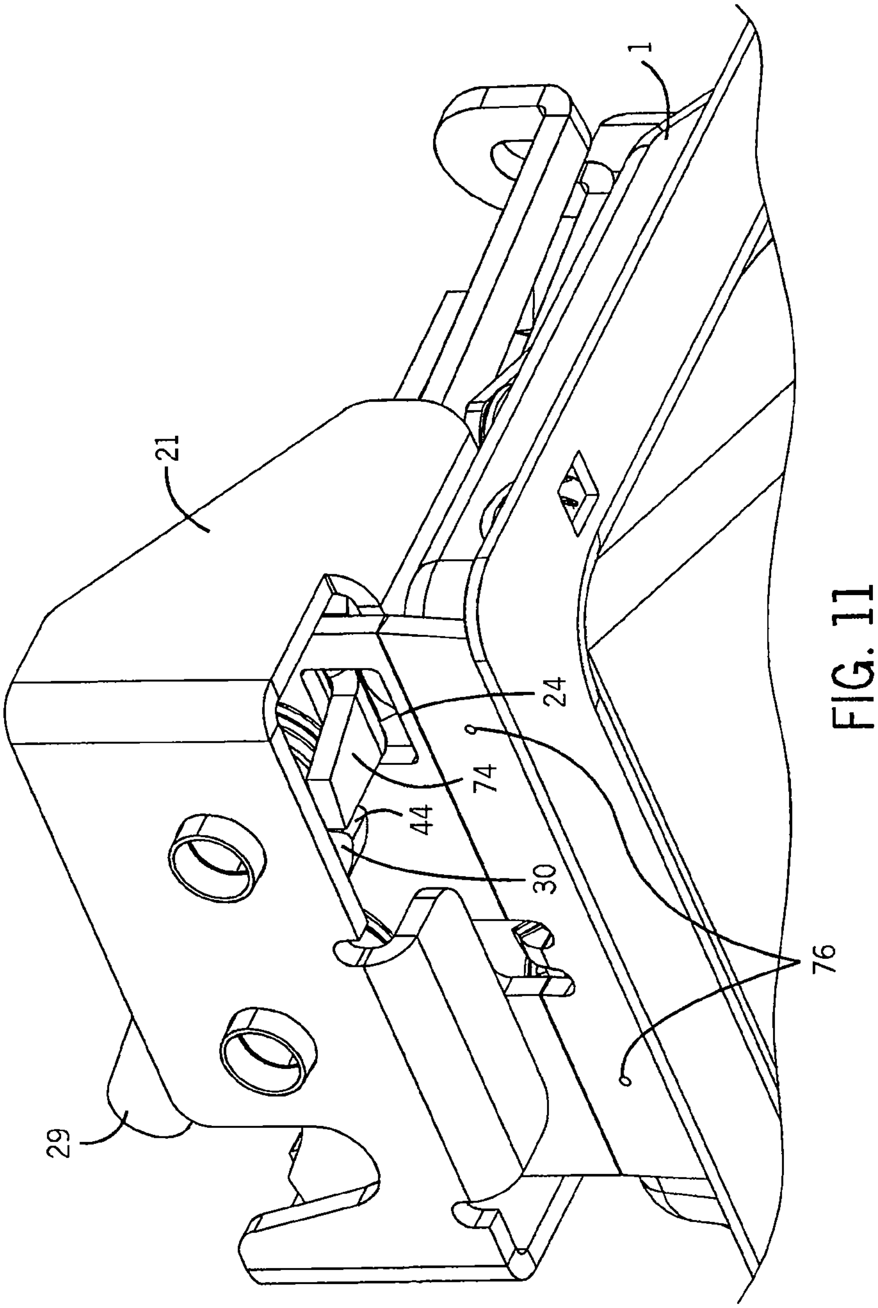
FIG. 11 is another partial, enlarged isometric view of the pawl assembly and lever assembly of the latch assembly of FIG. 1.

The inner bracket 22 may further include an alignment member 25, e.g., a protrusion, groove or ridge, that corresponds to a structural counterpart on the housing 1 of the latch assembly 8. The alignment member 25 facilitates proper attachment of the pawl assembly 21 to the housing 1 of the latch assembly 8 when the latch assembly 8 is assembled during manufacture. For example, as shown in FIG. 11, the alignment member 25 of the pawl assembly 21 corresponds with a detent in the housing 1 of the latch assembly 8. Along these lines, the inner bracket 22 may further include an angled portion 23 that is angled so as to correspond with the draft angle of the mating surface of the housing 1 to which the angled portion 23 of the inner bracket 22 corresponds. See, e.g., FIGS. 8 and 8*a*. This provides for a more proper alignment of the latch 29 with the strike 38. The inner bracket angled portion 23 may be attached to housing 1, e.g., via spot welds 76.

The inner bracket 22 further includes a strike slot 26 that is sized to receive a strike 38, which is a protrusion extending from the object to which the latch assembly 8 is attached. As shown in FIG. 4*b*, the strike slot 26 has a beveled edge 41 that helps to guide the strike 38 into the strike slot 26. By utilizing a beveled edge 41 as opposed to a rounded edge, the likelihood that strike 38 would be forced outside of the strike slot 26, which may jam the latch assembly 8, is reduced.

The inner bracket 22 further includes two axle holes 37 that receive axles 27*a* and 27 that respectively support the latch 29 and pawl 30. As shown in FIG. 3, both the latch 29 and the pawl 30 have holes that receive the axles 27*a* and 27 respectively. Thus, the latch 29 and pawl 30 rotate about the respective axles 27*a* and 27 when the pawl assembly 21 is actuated. The axles 27 and 27*a* also support a torsion spring 28. The spacers 27*b* support both coils of the torsion spring 28 and provide proper spacing between the outer bracket 31 and inner bracket 22.

The outer bracket 31 similarly includes holes 36 that receive and support the axles 27 and 27*a*, and a strike slot 26*a* that is sized to receive the strike 38. The outer bracket 31 has a flange 35 that extends inwardly with respect to the pawl assembly 21. See FIG. 3. The flange 35 prevents the latch 29 from over-rotating when the strike 38 rotates the latch 29 against the force of the spring 28. Specifically, the bottom surface 43 of the latch 29 abuts the top surface of the flange 35 when the pawl assembly 21 is in the closed position, i.e., when the strike 38 is secured by the latch 29. The outer bracket 31 includes a strike slot 26*a* that is sized to receive the strike 38.

The outer bracket 31 has a pivot flange 32 that cooperates with a common pivot 57, e.g., a pin, to serve as a common pivot for the latch assembly 8 by supporting the driven lever 16, the drive lever 18, and other components of the lever assembly 100. The outer bracket 31 may further include an additional flange 33 that may be used to attach the pawl assembly 21 to the housing 1, e.g., via spot welds 75.

FIGS. 4*a*-4*c* illustrate the operation of the pawl assembly 21. FIG. 4*a* shows the pawl assembly 21 in a closed position. More specifically, as discussed above, the strike 38 has forced the latch 29 to rotate in the clockwise direction (in the context of FIG. 4*a*) until the bottom surface 43 of the latch 29 contacts flange 35, thus preventing further rotation of the latch 29 in the clockwise direction. The strike 38 is secured within the strike slot 26*a* and causes the spring 28 to be in tension. Accordingly, the spring 28 biases the latch 29 in a counterclockwise direction. As shown in FIG. 4*a*, an end of the torsion spring 28 engages a notch 40 in the latch 29 to apply a force to the latch 29. The bevel 41 on the latch 29 assists the clockwise rotation of latch 29 when receiving the strike 38 into the latch slot 42.

When the pawl assembly 21 is in the closed position of FIG. 4*a*, the pawl 30 is biased in a clockwise direction by the spring 28. Specifically, the other end of the spring 28, i.e., the end opposite the end that is engaged with the latch 29, similarly engages a notch 39 in the pawl 30. Thus, the pawl 30 is biased in a clockwise direction (in the context of FIG. 4*a*).

When in the closed position, a protrusion 45 of the pawl 30 engages a first catch 47 in the latch 49, as shown in FIG. 4*a*. Thus, further rotation of the latch 29 in the counterclockwise direction is prevented by the interaction of the first catch 47 and the protrusion 45 of the pawl 30. The catch 47 is sized so as to create a gap between the catch 47 and the protrusion 45, which facilitates rotation of the latch 29 and the pawl 30 when the pawl 30 is actuated by the driven lever 16. Moreover, by increasing the size of the first catch 47 as opposed to reducing the size of the protrusion 45 to create the gap, the structural integrity of the pawl 30 may be increased. In other words, by increasing the size of the first catch 47 rather than decreasing the size of the protrusion 45, the structural integrity of the protrusion 45 is not compromised.

FIG. 4*b* shows the pawl assembly 21 in an intermediate position between the closed position of FIG. 4*a* and the open position of FIG. 4*c*. Specifically, the driven lever 16 (not shown in FIG. 4*b*) rotates the pawl 30 in a counterclockwise direction so that the protrusion 45 moves beyond the first catch 47 and engages a second catch 46 of the latch 29. The pawl 30 has a catch 44 that engages the driven lever 16, which, when actuated, rotates that pawl 30 in a counterclockwise direction to move the pawl assembly 21 into an unlocked position, shown in FIG. 4*c*.

FIG. 4*c* shows the pawl assembly 21 in an open position where the strike 38 can be separated from the assembly, in other words, where the door can be opened. As shown in FIG. 4*c*, the protrusion 45 has rotated beyond the second catch 46 and is engaging the surface 48 of the latch. Thus, when the pawl assembly 21 is in the open position shown in FIG. 4*c*, the latch 29 is positioned to receive the strike 38, e.g., when the door is closed. The force of closing the door drives the strike 38 into the strike slot 26*a*, where the strike 38 pushes against the latch 29 and forces the latch 29 to rotate in the clockwise direction and against the force of the spring 28. As the latch 29 is rotated, the spring 28 causes the pawl 30 to rotate in the clockwise direction, thus causing the protrusion 45 to rotate past the second catch 46 until the protrusion 45 is secured by the first catch 47. Thus, as the door is closed, the strike 38 causes the pawl assembly 21 to move from the open position to the closed position, where the protrusion 45 of the pawl 30 engages the first catch 47 of the latch 29 to maintain the pawl assembly 21 in the closed position.

Lever Assembly

Figure 8:
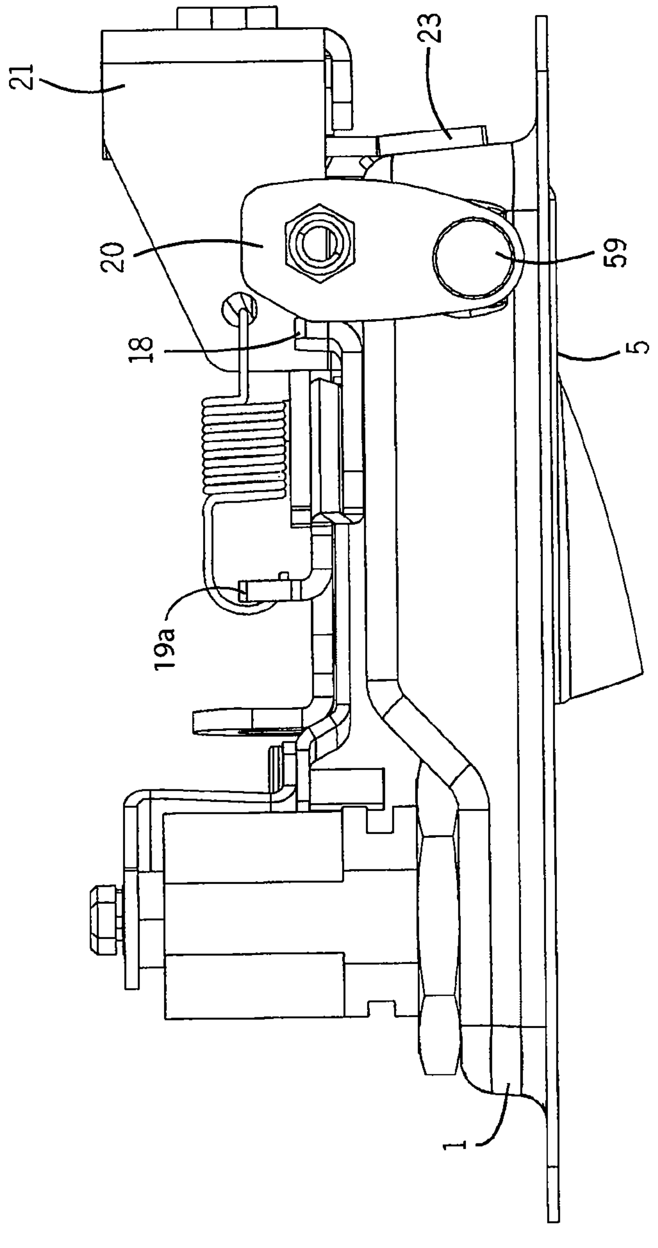
FIG. 8 is a side elevation view of the latch assembly of FIG. 1 in an unactuated position.
Figure 8A:
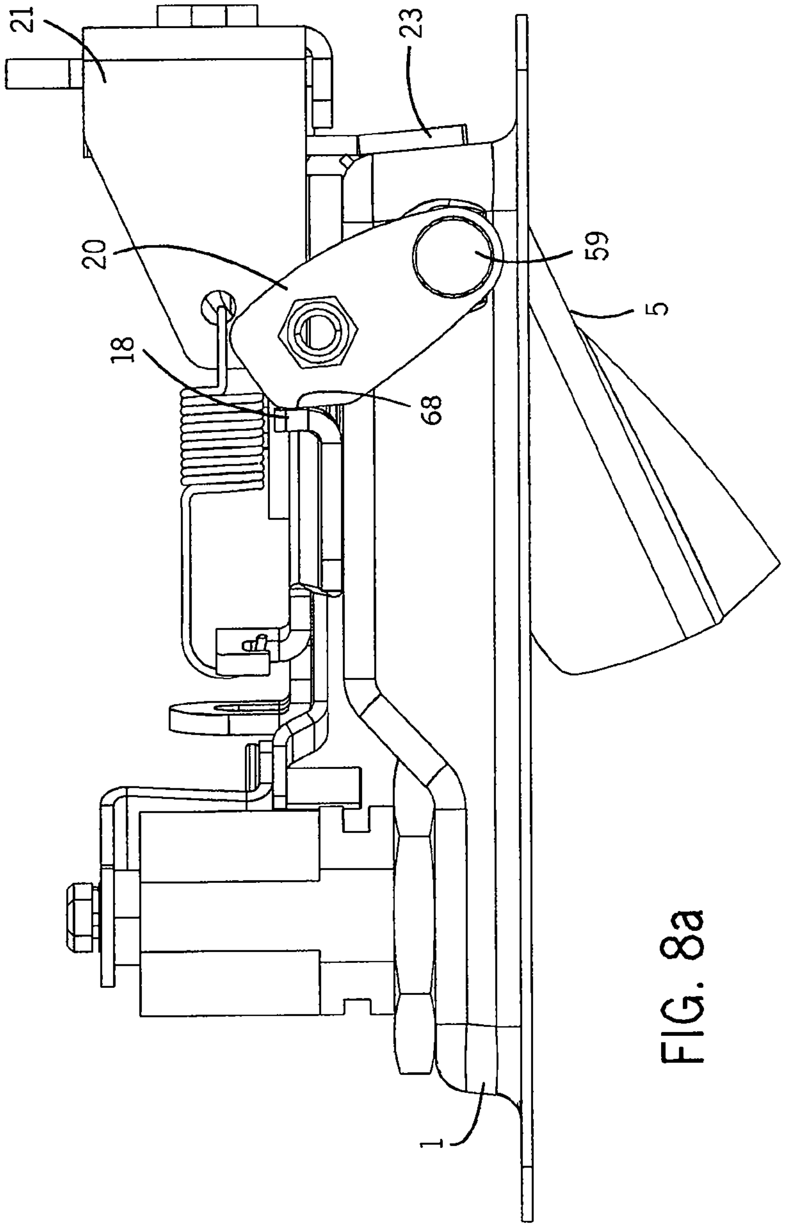
FIG. 8*a* is a side elevation view of the latch assembly of FIG. 1 in an actuated position.

As mentioned above, the pawl assembly 21 is actuated by tab 74 within the lever assembly 100, which is shown in an exploded view in FIGS. 5 and 11. The lever assembly 100 includes a drive lever 18 and a driven lever 16. The drive lever 18 and driven lever 16 are rotatably connected by the common pivot 57, e.g., a pin that engages holes 50*a*, 52 and 57*a*. There is a bearing or washer 17*a* between the head of the common pivot 57 and the drive lever 18, and another bearing or washer 50 between the drive lever 18 and the driven lever 16. The bearing 50 creates spacing between the drive lever 18 and the driven lever 16, which reduces binding as the drive lever 18 and driven lever 16 rotate with respect to one another. Moreover, the drive lever 18 may have an offset surface 58 that extends toward the housing. The purpose of the offset surface is to provide stability to the lever assembly 100. For example, in the context of FIG. 8, is to reduce binding of the drive lever 18 with the housing 1.

In the embodiment shown, the common pivot 57 is an internally threaded stud that receives a threaded screw 17 in order to secure the drive lever 18, driven lever 16, and bearings 50 on the common pivot 57. In an alternative embodiment, the common pivot 57 is a pin/press nut assembly that secures the drive lever 18, driven lever 16, and bearing 50 on the common pivot 57. The common pivot 57 also rotatably attaches the drive lever 18 and driven lever 16 to the pivot flange 32 that extends from the outer bracket 21. The pivot flange 32 may include a recess that receives the head of the common pivot 57 so that the head of the common pivot 57 does not extend below a bottom surface of the pivot flange 32. The pivot flange 32 and the common pivot 57 are contained within housing 1 and therefore do not penetrate the housing 1. This eliminates the need for a hole or opening in the housing 1 to accommodate the common pivot 57, which reduces the likelihood that water or other corrosive materials will penetrate the housing 1 and degrade the latch assembly 8.

Figure 6:
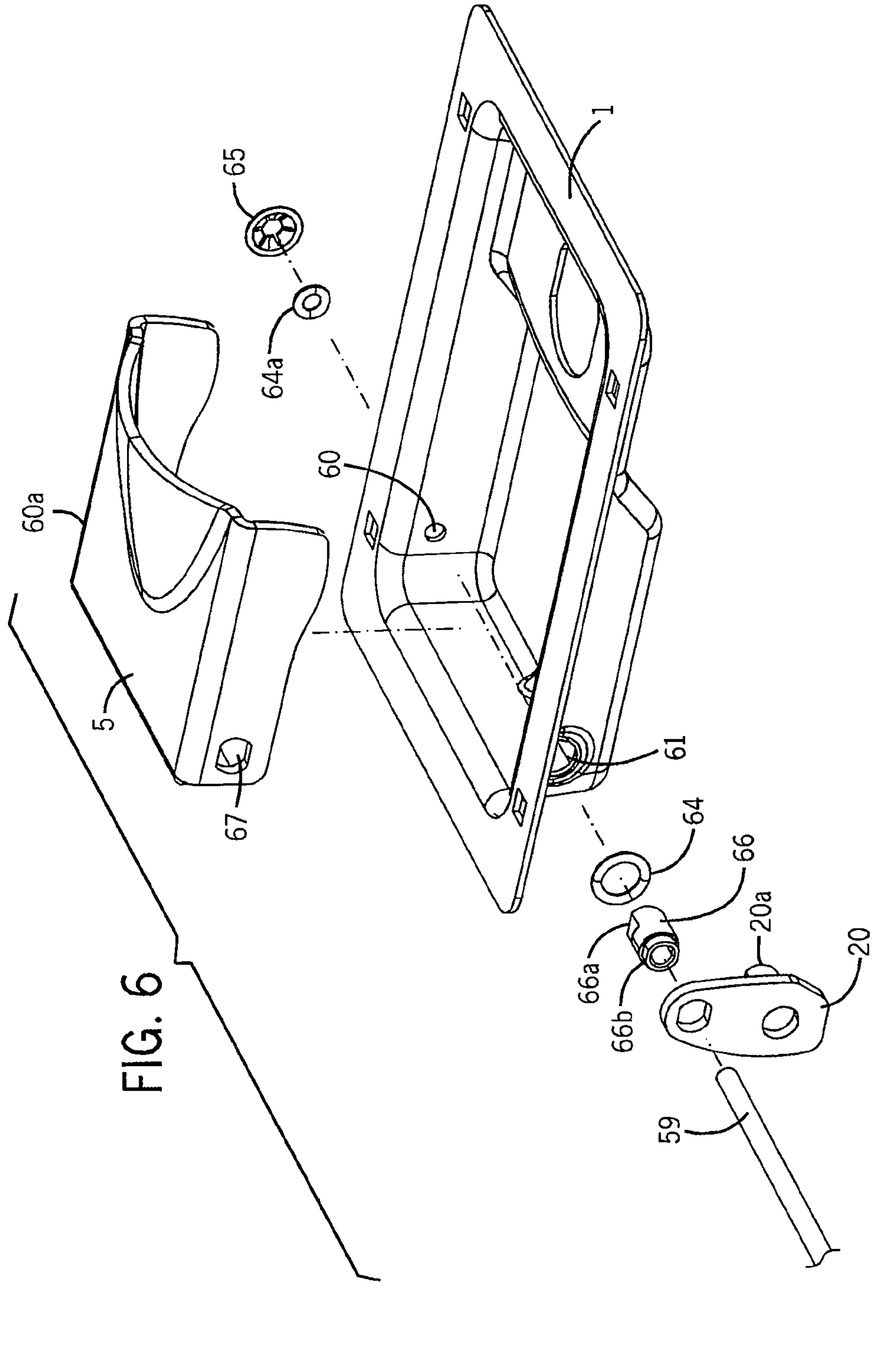
FIG. 6 an exploded view of the latch assembly of FIG. 1.

The lever assembly 100 is actuated by the handle 5, e.g., when a user pulls the handle 5. As shown in FIG. 6, the handle 5 is operably connected to the lever assembly 100 by an axle 59 and a cam lever 20. More specifically, as shown in FIGS. 6 and 8 for example, the cam lever 20 engages a flange 68 of the drive lever 18. Thus, as the cam lever 20 is rotated, the cam lever 20 pushes against the flange 68 to rotate the drive lever 18 about the common pivot 57.

As shown in FIG. 6, the cam lever 20 is attached a collar 66 such that the cam lever 20 rotates about the axle 59. In other words, rotating the collar 66 causes the cam lever 20 to rotate. The collar 66 (and thus the cam lever 20) is rotated when the handle 5 is actuated, e.g., pulled. Specifically, the handle 5 has at least one faceted slot 57 that receives the collar 66. The collar 66 is fitted with at least one faceted surface 66*a* that corresponds to the faceted slot 67 in the handle 5. See, e.g., FIG. 7. Accordingly, when the handle is pulled, the facets of the slot 67 cooperate with the facets 66*a* to rotate the collar 66 and the cam lever 20. The slot 60*a* opposite the slot 67 may or may not be faceted as desired.

There is a flange 69 at one end of the axle 59 proximate the cam lever 20 to secure the axle 59 within the axle holes 60, 61 in the housing 1. The other end of the axle 59 may be secured using press nut 65 in combination with seals 64, 64*a* to prevent water or other material from penetrating the housing 1. Alternatively, the flange 69 or press nut 65 could be replaced with any fastener capable of securing the axle 59 within axle holes 60, 61.

Figure 7:
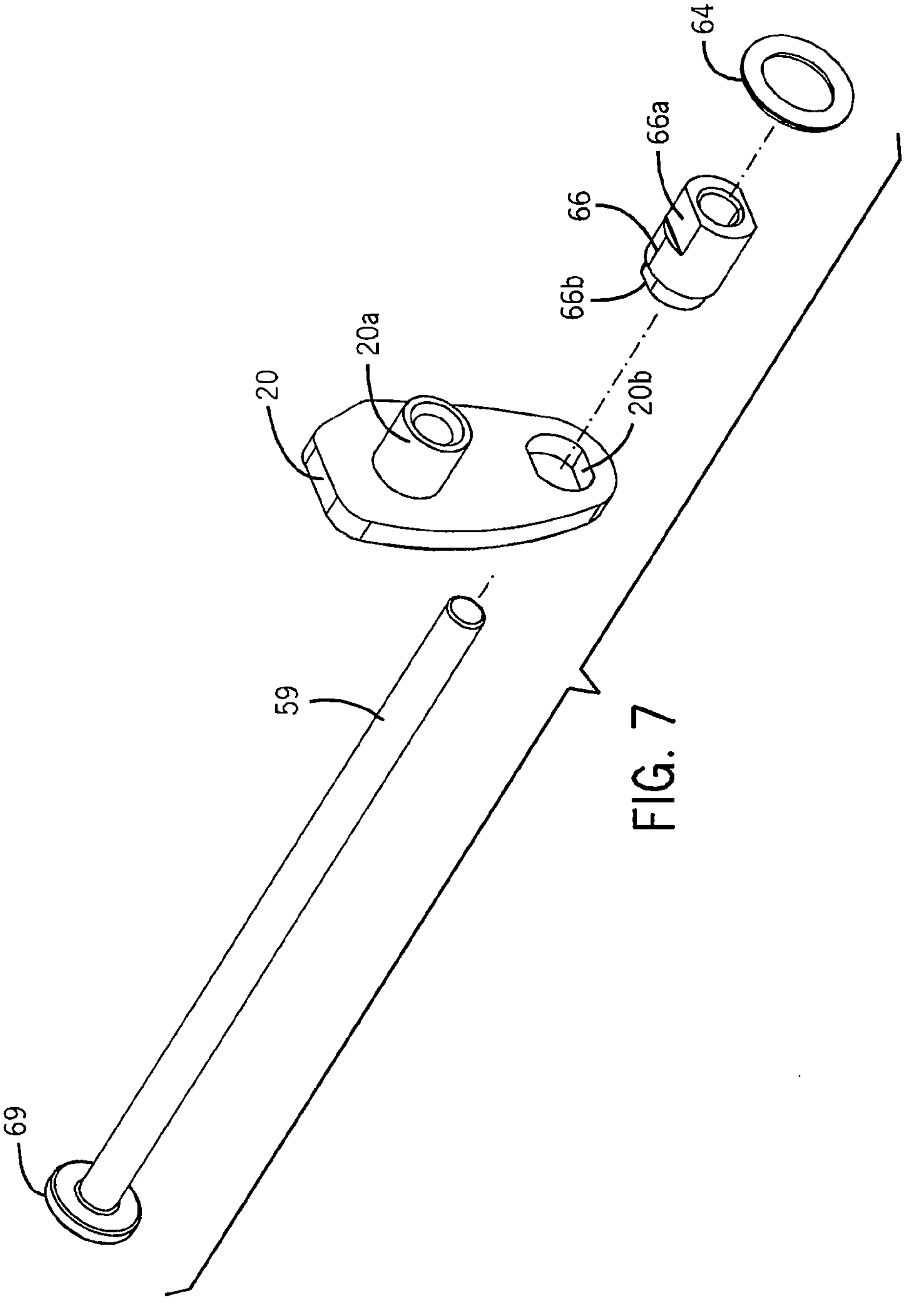
FIG. 7 is an isometric view of a cam lever incorporated into the latch assembly of FIG. 1.

As shown in FIG. 7, the cam lever 20 may be comprised of multiple pieces. In the embodiment shown, the cam lever 20 includes a separate collar 66 that is attached, e.g., via a press fit, to the main body of the cam lever 20. The collar 66 includes facets 66*b* that correspond to facets 20*b* in an aperture of the main body of the cam lever 20. These mating facets 66*a*, 66*b* and 20*b* prevent the main body of the cam lever 20 from rotating with respect to the collar 66, thus facilitating rotation of the cam lever 20 when the collar 66 is rotated. The collar 66 includes another facet 66*a* that corresponds to a facet in an aperture 67 in the handle 5 that receives the collar 66 and axle 59. Thus, when the handle 5 is rotated, the facets 66*a* and 67 cooperate to rotate the collar 66 and the axle 59. In order to prevent over-rotation of the cam lever 20, the cam lever 20 may include a stop 20*a* that extends from the cam lever 20. In an alternate embodiment, the cam lever 20 and collar 66 may be integral with one another. The collar 66 may further include a step to receive an o-ring.

The disclosed cam lever configuration is desirable to prevent water or other materials from infiltrating the inside of the latch assembly 8, which may cause corrosion and deterioration of the assembly over time. The cam lever 20 is positioned inwardly with respect to the handle 5 so that the cam lever 20 will be completely contained by the housing 1 of the latch assembly 8. In other words, the cam lever 20 does not extend through the housing 1—it is contained completely on one side of the housing 1. This configuration eliminates the need for another hole in the housing 1, which reduces the likelihood that water or other corrosive materials might penetrate the housing 1 and degrade the latch assembly 8.

Figure 9A:
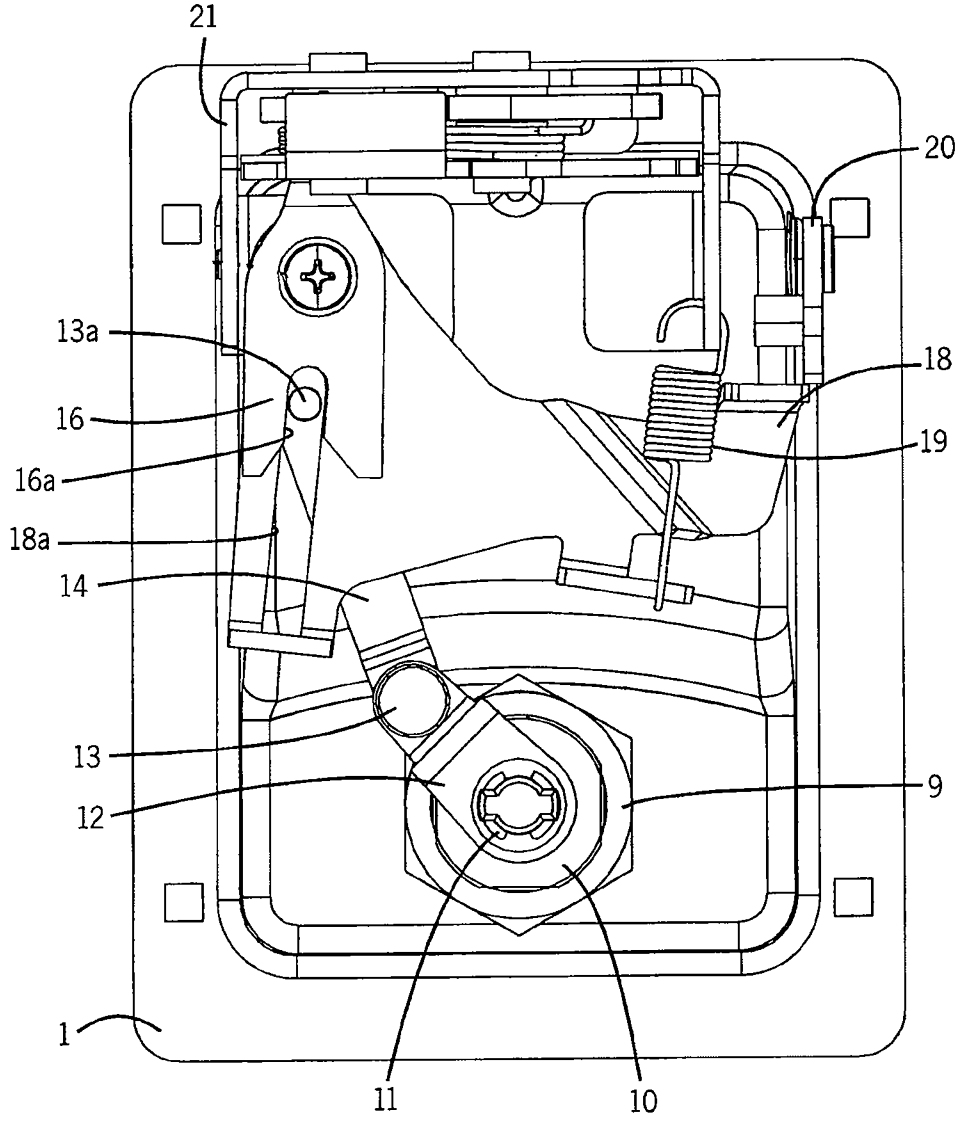
FIG. 9*a* is an elevational view of the latch assembly of FIG. 1 in an unlocked, actuated position.

FIGS. 8-9*a* illustrate the interaction between the cam lever 20 and the drive lever 18. Specifically, FIGS. 8 and 9 show the latch assembly 8 in an unactuated position. The drive lever 18 is biased toward the cam lever 20 by a biasing element 19, e.g., spring 19. The spring 19 is attached to a flange 19*a* on the drive lever 18 at one end and to the outer bracket 31 of the pawl assembly 21 at the other end. Thus, the spring pulls the drive lever 18 against the cam lever 20.

As shown in FIG. 9, the spring is parallel to the wall of the pawl assembly 21 to which it is attached. Therefore, in the context of FIG. 9, when the drive lever 18 is actuated by the cam lever 20, the spring 19 is stretched straight downwardly (or vertically) along an axis that is tangent to an arc along which the drive lever 18 moves. In other words, the spring 19 lies along an axis that is parallel to the plane through with the cam lever 20 moves. Accordingly, there is no wasted energy along a horizontal vector (in the context of FIG. 9) because the spring 19 is being pulled only in the vertical direction. One way to achieve this is by attaching the spring 19 to the pawl assembly 21 at a point that is inward of the cam lever 20 with respect to the outer perimeter of the housing 1. Alternatively, the spring 19 could be positioned so that it is outward of the cam lever 20 with respect to the outer perimeter of the housing 1. Still further, where the spring 19 is positioned in the same plane as the cam lever 20, i.e., in the plane through which the cam lever 20 rotates, the spring 19 can be positioned above the cam lever 20 (in the context of FIG. 8) so that the spring 19 does not interfere with the movement of the cam lever 20. Otherwise, the spring 19 would have to be angled with respect to the plane through which the cam lever 20 moves, which is undesirable.

Figure 10:
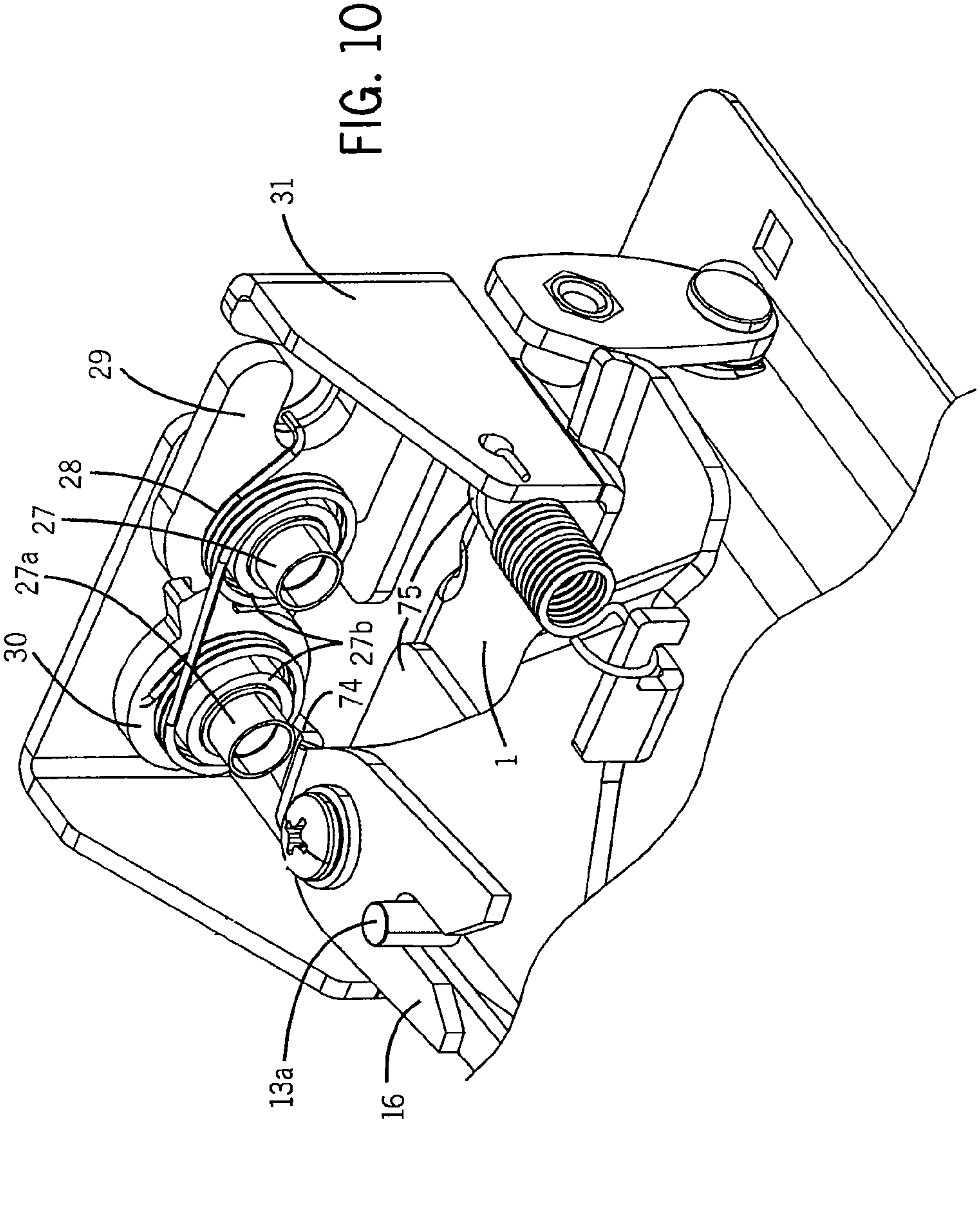
FIG. 10 is a partial, enlarged isometric view of the pawl assembly and lever assembly of the latch assembly of FIG. 1.

When the handle 5 is pulled downwardly (in the context of FIG. 8*a*), the axle 59 and cam lever 20 is rotated in a counterclockwise direction, thus causing the cam lever 20 to push against the flange 68 of the driven lever 18, and against the force of the spring 19. As shown in FIG. 9*a*, the protrusion 13*a* is in the first position, thus engaging the driven lever 16 with the drive lever 18. Accordingly, as the drive lever 18 is rotated in a clockwise direction (in the context of FIG. 9*a*), the drive lever 18, via the protrusion 13*a*, causes the driven lever 16 to rotate in a clockwise direction. This causes the driven lever 16 to actuate the pawl assembly 21 by rotating the pawl 30. The interaction of between the driven lever 16 and the pawl assembly 21 is shown in FIG. 10 (where the inner bracket 22 has been removed for clarity) and FIG. 11.

Conversely, when the protrusion 13*a* was in the closed position, e.g., toward the bottom of the slot in the drive lever 18 (in the context of FIG. 12), the drive lever 18 does not engage the driven lever 16, thus preventing actuation of the pawl assembly 21. See FIG. 12. In other words, the user would pull the handle 5 to actuate the drive lever 18, but the pawl assembly 21 would not be actuated and would therefore not release the strike 38.

As shown in FIG. 2, the end of the slot 18*b* of the drive lever 18 is angled with respect to the body of the drive lever 18. In the embodiment shown, the end of the slot 18*b* is substantially perpendicular with respect to the drive lever 18. The angled nature of the end of the slot 18*b* enables the removal of the rod 14 and protrusion 13*a* without the need to disassemble the lever assembly 100. Accordingly, the lock assembly 7 may be exchanged or replaced without disturbing the other assemblies included in the latch assembly 8.

Various alternatives and modifications are contemplated as being within the scope of the following claims particularly pointing out and distinctly claiming the subject matter regarded as the invention.

I claim:

1. A latch assembly comprising:

a pawl assembly having an open position and a closed position;

a lever assembly that actuates the pawl assembly from the closed position to the open position, the lever assembly comprising:

a drive lever having a slot; and a driven lever having a slot that is open on one end;

a lock assembly having an engagement member that moves along the slot of the drive lever between an engaged position where the engagement member is received within the slot of the driven lever and a disengaged position where the engagement member is outside of the slot of the driven lever;

a cam lever that actuates the drive lever; and a biasing element that biases the drive lever toward the cam lever, wherein the biasing element is aligned with an axis that is substantially parallel to a plane through which the cam lever moves.

2. The latch assembly of claim 1, wherein the open end of the slot in the driven lever is wider than a closed end of the slot in the driven lever.

3. The latch assembly of claim 2, wherein the slot in the driven lever has a pair of beveled edges at the open end of the slot.

4. The latch assembly of claim 1, wherein the lock assembly further comprises a linkage and a lock actuator, and wherein the engagement member is moved between the engaged position and the disengaged position by rotating the lock actuator.

5. The latch assembly of claim 4, wherein the lock actuator is a cylinder that receives a key.

6. The latch assembly of claim 1, further comprising:

a housing that supports the pawl assembly, the lever assembly and the lock assembly;

a cam lever that actuates the drive lever, wherein the cam lever is positioned on one side of the housing and does not extend through the housing; and a biasing element that biases the drive lever toward the cam lever.

7. The latch assembly of claim 1, wherein the biasing element is aligned with an axis that is substantially parallel to a plane through which the cam lever moves.

8. The latch assembly of claim 1, wherein the slot of the drive lever is nonplanar.

9. The latch assembly of claim 1, wherein a first part of the slot of the drive lever lies in a first plane and a second part of the slot of the drive lever lies in a second plane that is substantially perpendicular to the first plane.

10. The latch assembly of claim 1, wherein the lock assembly is removable from the latch assembly without disassembly of the lever assembly.

11. A latch assembly comprising:

a housing; and a lever assembly supported by the housing, the lever assembly comprising a drive lever having a slot;

a driven lever having a slot, wherein the drive lever drives the driven lever when an engagement member is positioned within the slot of the driven lever; and a cam lever that actuates the drive lever, wherein the cam lever is positioned on one side of the housing and does not extend through the housing.

12. The latch assembly of claim 11, wherein the drive lever is biased toward the cam lever by a biasing element that is aligned along an axis that is substantially parallel to a plane through which the cam lever moves.

13. The latch assembly of claim 11, wherein the slot of the driven lever is open on one end.

14. The latch assembly of claim 11, wherein the engagement member is movable between a first position where the engagement member is received within the slot of the driven lever and a second position where the engagement member is outside the slot of the driven lever.

15. The latch assembly of claim 14, wherein a lock assembly causes the engagement member to move between the first position and the second position.

16. The latch assembly of claim 15, wherein the lock assembly is removable from the latch assembly without disassembly of the lever assembly.

17. The latch assembly of claim 11, wherein an end of the slot in the drive lever is angled with respect to the remainder of the drive lever.

18. The latch assembly of claim 17, wherein the engagement member may be removed from the slot of the drive lever without disassembly of the lever assembly.

19. A latch assembly comprising:

a housing;

a handle that is rotatably attached to the housing by an axle;

a pawl assembly supported by the housing, the pawl assembly having an open position and a closed position;

a lever assembly that actuates the pawl assembly from the closed position to the open position, the lever assembly being supported by the housing and comprising:

a drive lever having a slot;

a driven lever having a slot that is open on one end; and a cam lever that actuates the drive lever, the cam lever being secured to the axle so that rotation of the axle causes the cam lever to rotate;

wherein the cam lever is positioned on one side of the housing and does not extend through the housing;

a lock assembly having an engagement member that moves along the slot of the drive lever between an engaged position where the engagement member is received within the slot of the driven lever and a disengaged position where the engagement member is outside of the slot of the driven lever;

wherein the drive lever drives the driven lever only when the engagement member is in the engaged position.

* * * * *